US008862326B2

(12) United States Patent
Tsuruta et al.

(10) Patent No.: US 8,862,326 B2
(45) Date of Patent: Oct. 14, 2014

(54) VEHICLE TRAVEL ASSISTING DEVICE

(71) Applicant: Denso Corporation, Kariya (JP)

(72) Inventors: Tomohiko Tsuruta, Aichi-ken (JP); Yusuke Ueda, Nishio (JP); Takeshi Hatoh, Nagoya (JP); Takayuki Kondoh, Kuwana (JP); Naoya Inoue, Aichi-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/151,068

(22) Filed: Jan. 9, 2014

(65) Prior Publication Data

US 2014/0200768 A1   Jul. 17, 2014

(30) Foreign Application Priority Data

Jan. 11, 2013   (JP) .................................. 2013-003656

(51) Int. Cl.
*B62D 6/00*   (2006.01)

(52) U.S. Cl.
CPC ........................................ *B62D 6/00* (2013.01)
USPC ............. 701/41; 701/466; 701/300; 701/301; 701/302

(58) Field of Classification Search
None
See application file for complete search history.

(56) References Cited

U.S. PATENT DOCUMENTS

| | | | | |
|---|---|---|---|---|
| 6,741,168 B2 * | 5/2004 | Webb et al. | ..................... | 340/436 |
| 7,698,086 B2 * | 4/2010 | Kidd et al. | ..................... | 702/113 |
| 8,026,799 B2 * | 9/2011 | Isaji et al. | ..................... | 340/435 |
| 2002/0103622 A1 * | 8/2002 | Burge | ............................ | 702/183 |
| 2002/0183905 A1 * | 12/2002 | Maeda et al. | ..................... | 701/35 |
| 2004/0189454 A1 * | 9/2004 | Shimoyama | ................... | 340/436 |
| 2004/0254729 A1 * | 12/2004 | Browne et al. | ................. | 701/301 |
| 2005/0080530 A1 * | 4/2005 | Arduc et al. | ..................... | 701/37 |
| 2006/0100762 A1 * | 5/2006 | Matsunaga et al. | ............. | 701/45 |
| 2007/0035182 A1 * | 2/2007 | Wellhoefer et al. | ........... | 307/120 |
| 2007/0106474 A1 * | 5/2007 | Ide | ................ | 701/301 |
| 2007/0150140 A1 * | 6/2007 | Seymour | ......................... | 701/35 |
| 2008/0048850 A1 * | 2/2008 | Yamada | ......................... | 340/439 |
| 2008/0059054 A1 * | 3/2008 | Yamada | ......................... | 701/200 |
| 2010/0198446 A1 * | 8/2010 | Erb et al. | ......................... | 701/29 |
| 2010/0228432 A1 * | 9/2010 | Smith et al. | ..................... | 701/35 |
| 2010/0305812 A1 * | 12/2010 | Nagao | ............................ | 701/35 |
| 2010/0305818 A1 * | 12/2010 | Doerr et al. | ..................... | 701/46 |

(Continued)

FOREIGN PATENT DOCUMENTS

| | | |
|---|---|---|
| JP | 2006-168628 | 6/2006 |
| JP | 2012-008999 | 6/2009 |
| JP | 4325363 | 9/2009 |
| JP | 2012-058984 | 3/2012 |

*Primary Examiner* — Jonathan M Dager
(74) *Attorney, Agent, or Firm* — Harness, Dickey & Pierce, PLC

(57) ABSTRACT

In a vehicle travel assisting device, a vehicle speed, a yaw rate, a traveling lane of an own vehicle, and a position of a leading vehicle are detected. Target travel coordinates of the own vehicle are calculated, based on the traveling lane and the position of the leading vehicle A travel path curvature of a target travel coordinate group is estimated, based on information related to the target travel coordinate group. A steering quantity to be steered in advance by the own vehicle is calculated, based on the currently estimated travel path curvature. A weight for each of the target travel coordinates for estimating the travel path curvature is adjusted based on the vehicle speed, the yaw rate and the previously estimated travel path curvature. Steering control is performed such that the own vehicle travels so as to follow the estimated travel path curvature, based on the calculated steering quantity.

17 Claims, 5 Drawing Sheets

(56) References Cited

U.S. PATENT DOCUMENTS

| | | | |
|---|---|---|---|
| 2010/0324774 A1* | 12/2010 | Bouni et al. | 701/29 |
| 2011/0153164 A1* | 6/2011 | Hiemer et al. | 701/45 |
| 2011/0202241 A1* | 8/2011 | Le et al. | 701/46 |
| 2011/0264395 A1* | 10/2011 | Smith et al. | 702/113 |
| 2011/0295548 A1 | 12/2011 | Takabayashi et al. | |
| 2011/0304447 A1* | 12/2011 | Marumoto | 340/438 |
| 2012/0197481 A1* | 8/2012 | Takeda | 701/31.4 |
| 2012/0265406 A1* | 10/2012 | Lang et al. | 701/45 |
| 2012/0277987 A1* | 11/2012 | Marumoto | 701/123 |
| 2013/0124052 A1* | 5/2013 | Hahne | 701/46 |
| 2013/0320654 A1* | 12/2013 | Clark et al. | 280/735 |
| 2014/0180530 A1* | 6/2014 | Wanami | 701/32.2 |
| 2014/0200738 A1* | 7/2014 | Wanami | 701/1 |

\* cited by examiner

FIG.2A

[WEIGHT FOR CALCULATING TARGET TRAVEL COORDINATE GROUP USED IN CURVATURE ESTIMATION IS ADJUSTED BASED ON VEHICLE SPEED OF OWN VEHICLE AND PREVIOUS ESTIMATION RESULT BY TRAVEL PATH CURVATURE ESTIMATING SECTION]

WHEN TRAVEL TARGET COORDINATES ARE ALMOST STRAIGHT

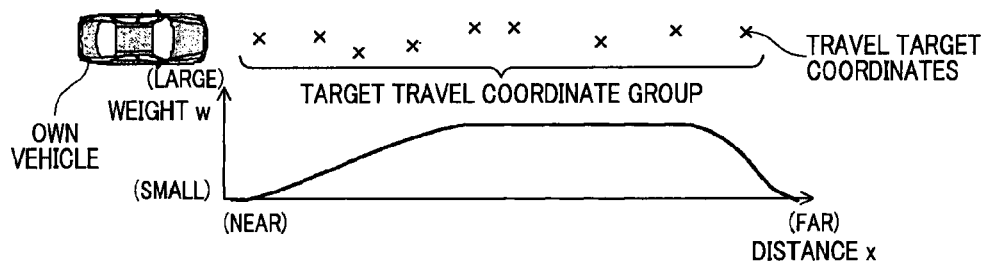

FIG.2B

WHEN TRAVEL TARGET COORDINATES CHANGE FROM STRAIGHT TO CURVED

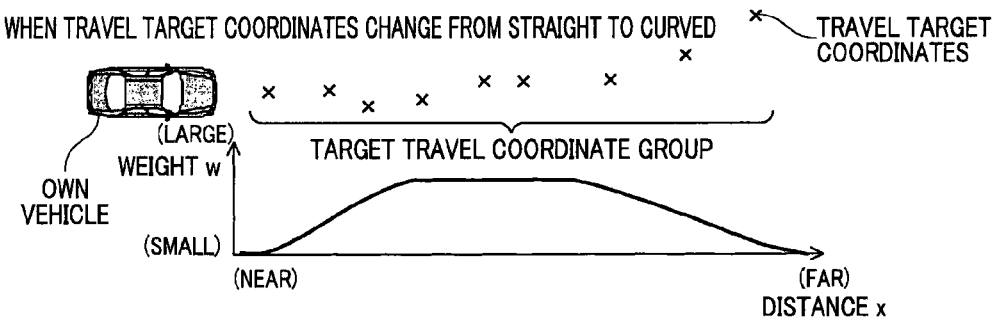

FIG.2C

WHEN VEHICLE SPEED IS HIGH

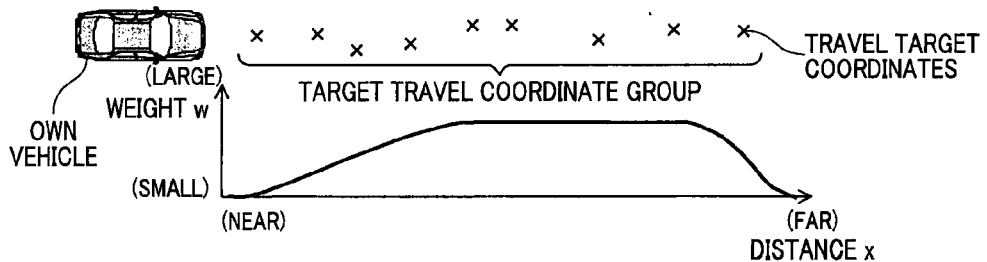

FIG.2D

WHEN VEHICLE SPEED IS LOW

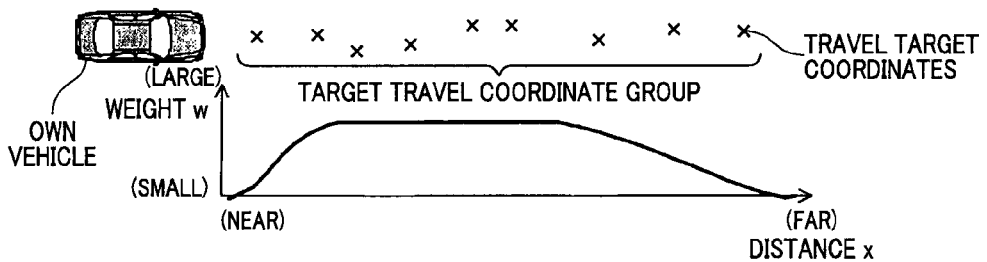

VEHICLE TRAVEL ASSISTING DEVICE

CROSS-REFERENCE TO RELATED APPLICATION

This application is based on and claims the benefit of priority from earlier Japanese Patent Application No. 2013-003656 filed Jan. 11, 2013, the description of which is incorporated herein by reference.

BACKGROUND

1. Technical Field

The present invention relates to a technology for assisting vehicle travel.

2. Related Art

In related art, devices for assisting lane traveling of a vehicle are known. The device premises a traveling lane to be an arc based on positional coordinates of the traveling lane, using the least-squares method. The device then performs travel assistance based on the curvature of the arc and the vehicle state (refer to JP-B-4325363).

However, in the device for assisting lane traveling of a vehicle such as that described above, the accuracy of curvature estimation varies depending on the accuracy of the positional coordinates of the traveling lane. A problem occurs in that the variation in accuracy may cause the vehicle to drift. In addition, when the road on which the vehicle is traveling changes from a straight line to a curve, the road is recognized as being a curve earlier than it actually is. A problem occurs in that the vehicle travels further to the inner side of the curve than a targeted positional coordinate group.

SUMMARY

It is thus desired to enhance the reliability of steering control in a vehicle travel assisting device.

According to an exemplary embodiment of the present disclosure, there is provided a vehicle travel assisting device including travel state quantity detecting means, periphery monitoring means, target travel coordinate recording means, travel path curvature estimating means, steering feed-forward calculating means, and steering control means.

The travel state quantity detecting means detects a vehicle speed and a yaw rate that are travel state quantities indicating a traveling state of an own vehicle in which the vehicle travel assisting device is mounted.

The periphery monitoring means detects a traveling lane in which the own vehicle is traveling and a position of a leading vehicle present ahead of the own vehicle.

The target travel coordinate recording means calculates target travel coordinates that are target coordinates to be traveled by the own vehicle, based on the traveling lane and the position of the leading vehicle detected by the periphery monitoring means.

The travel path curvature estimating means estimates a travel path curvature that is a curvature of a target travel coordinate group, based on information related to the target travel coordinate group recorded by the target travel coordinate recording means.

The travel path curvature estimating means includes curvature estimation calculation adjusting means. The curvature estimation calculation adjusting means adjusts a weight for each of the target travel coordinates used to estimate the travel path curvature, based on the vehicle speed and the yaw rate detected by the travel state quantity detecting means and a previously estimated travel path curvature.

The steering feed-forward calculating means calculates in advance a steering quantity to be steered by the own vehicle, based on the travel path curvature estimated by the travel path curvature estimating means.

The steering control means performs steering control such that the own vehicle travels such as to follow the travel path curvature estimated by the travel path curvature estimating means, based on the steering quantity calculated by the steering feed-forward calculating means.

In the vehicle travel assisting device configured as described above, the accuracy of travel path curvature estimation can be improved. Such a steering control that can track the traveling state of the own vehicle and changes in the shape of the road can be actualized. Reliability of steering control can be enhanced.

The travel path curvature estimating means may estimate the travel path curvature by an approximated curve formed into an arc-like shape which is determined using a least-squares method, based on the target travel coordinate group. The travel path curvature estimating means may determine the approximated curve such that a center of the arc is set on a normal line of a travel vector of the own vehicle.

The travel path curvature estimating means may determine the approximated curve such that: (i) a center of the arc is set on a normal line of a travel vector of the own vehicle; and (ii) the arc is set on a center of gravity of the own vehicle or a center of rear tires of the own vehicle. The travel path curvature estimating means may determine the approximated curve such that a center of the arc is set at any point.

The travel path curvature estimating means may include multiple curvature estimation result calculating means for performing calculation based on a plurality of estimation results of the travel path curvature such that the curvature changes smoothly.

The curvature estimation calculation adjusting means may adjust the weight of each of the target travel coordinates by smoothly deviating the weight near a border of the target travel coordinate group such that the weight becomes zero when each of the target travel coordinates is added to or deleted from the target travel coordinate group.

BRIEF DESCRIPTION OF THE DRAWINGS

In the accompanying drawings:

FIG. 2A to FIG. 2D are schematic diagrams for explaining a relationship between target travel coordinates and weights for each of the target travel coordinates used to estimate a travel path curvature;

DESCRIPTION OF EMBODIMENTS

An embodiment of the present invention will hereinafter be described with reference to the drawings. The present invention is not limited to the embodiment described hereafter. Various aspects of the present invention are possible.

Figure 1:
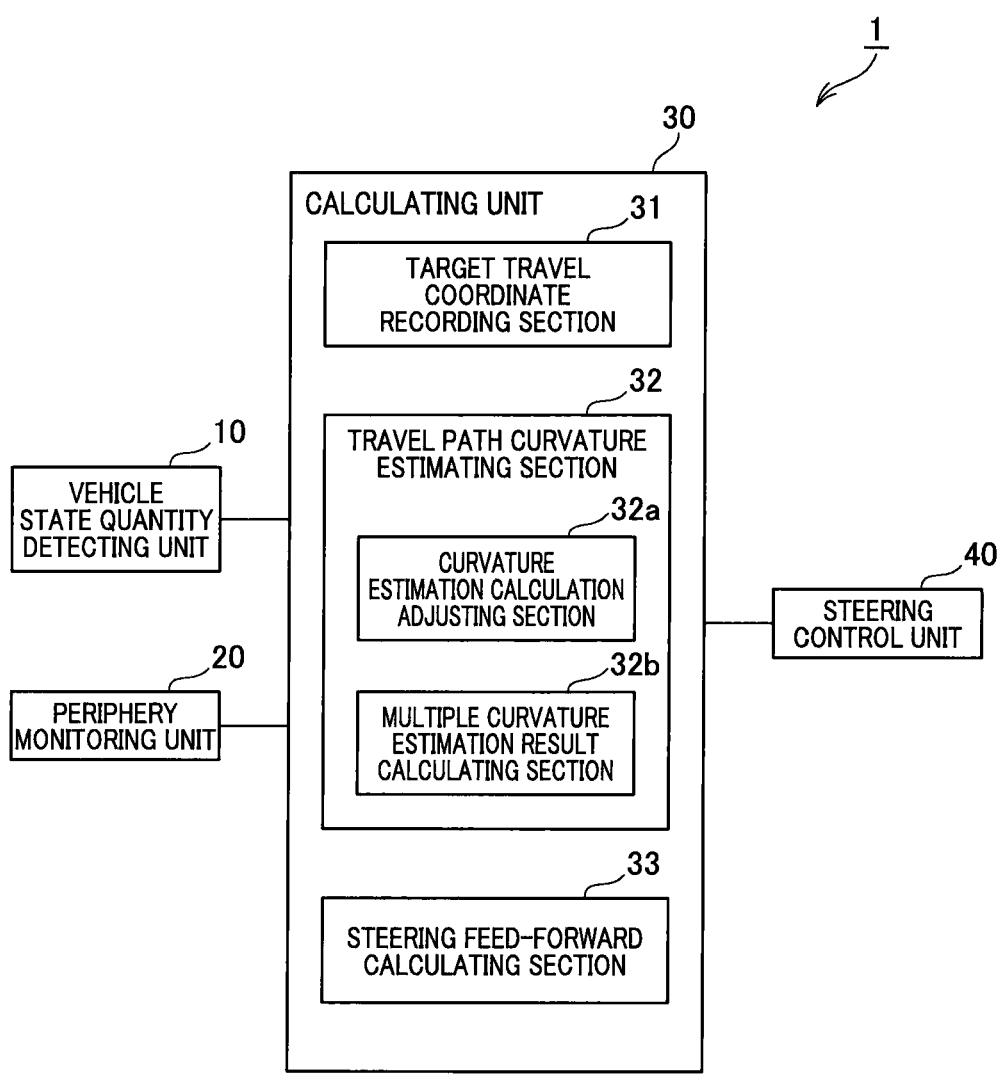
FIG. 1 is a block diagram of a configuration of a travel assisting device according to an embodiment.

FIG. 1 shows a vehicle travel assisting device (referred to, hereinafter, as a travel assisting device) 1 to which the present embodiment is applied. The travel assisting device 1 is mounted in a vehicle (hereinafter referred to as "own vehicle", as needed) and includes a vehicle state quantity detecting unit 10, a periphery monitoring unit 20, a calculating unit 30, and a steering control unit 40. The periphery monitoring unit 20 detects conditions surrounding the vehicle.

The vehicle state quantity detecting unit 10 includes a steering angle encoder, a vehicle speed encoder, and a yaw rate sensor.

The steering angle encoder is a sensor that detects a steering angle of the own vehicle as a traveling state quantity. The traveling state quantity indicates the traveling state of the own vehicle. The steering angle encoder outputs a signal based on the steering angle to the calculating unit 30.

The vehicle speed encoder is a sensor that detects a traveling speed (vehicle speed) of the own vehicle as the traveling state quantity. The vehicle speed encoder outputs a signal based on the traveling speed to the calculating unit 30.

The yaw rate sensor is a sensor that detects a rotation speed of a shaft facing a vertical direction of the own vehicle as the traveling state quantity. The yaw rate sensor outputs a signal based on the yaw rate to the calculating unit 30.

Known sensors can be used as the steering angle encoder, the vehicle speed encoder, and the yaw rate sensor. The sensors are not particularly limited. In addition, the traveling speed of the own vehicle may be detected using the signal outputted from the vehicle speed encoder. Alternatively, the traveling speed of the own vehicle may be determined using a satellite positioning device, such as a global positioning system (GPS) device, instead of the speed encoder. The satellite positioning device locates the position of the own vehicle.

The periphery monitoring unit 20 includes at least a front sensor, a left-side sensor, and a right-side sensor. A detection area of the front sensor is a predetermined angular range of which the center is the straight-ahead direction ahead of the vehicle. A detection area of the left-side sensor is a predetermined angular range of which the center is a vehicle-width direction on the left side of the vehicle. A detection area of the right-side sensor is a predetermined angular range on the right side of the vehicle (similar to that of the left-side sensor).

The periphery monitoring unit 20 detects the traveling lane on which the own vehicle is traveling. In addition, the periphery monitoring unit 20 detects the position of a leading vehicle present ahead of the own vehicle. The front sensor is composed of an image sensor (camera) or a laser radar. The left- and right-side sensors are each composed of any of an image sensor, a laser radar, a millimeter-wave sensor, or a sonar.

The calculating unit 30 is mainly provided with a target travel coordinate recording section 31, a travel path curvature estimating section 32, and a steering feed-forward calculating means 33. In addition, the travel path curvature estimating section 32 is provided with a curvature estimation calculation adjusting section 32a and a multiple curvature estimation result calculating unit 32b.

In addition, the calculating unit 30 is a microcomputer including a central processing unit (CPU), a read-only memory (ROM), a random access memory (RAM), an input/output interface, and the like. A control program stored in a storage device, such as the ROM, allows the CPU to function as the above-described target travel coordinate recording section 31, the travel path curvature estimating section 32 (including the curvature estimation calculation adjusting section 32a and the multiple curvature estimation result calculating unit 32b), and the steering feed-forward calculating means 33.

The steering control unit 40 performs steering control based on the steering quantity calculated by the calculating unit 30. The steering control unit 40 performs steering control such that the own vehicle travels such as to follow a travel path curvature estimated by the calculating unit 30.

Figure 5:
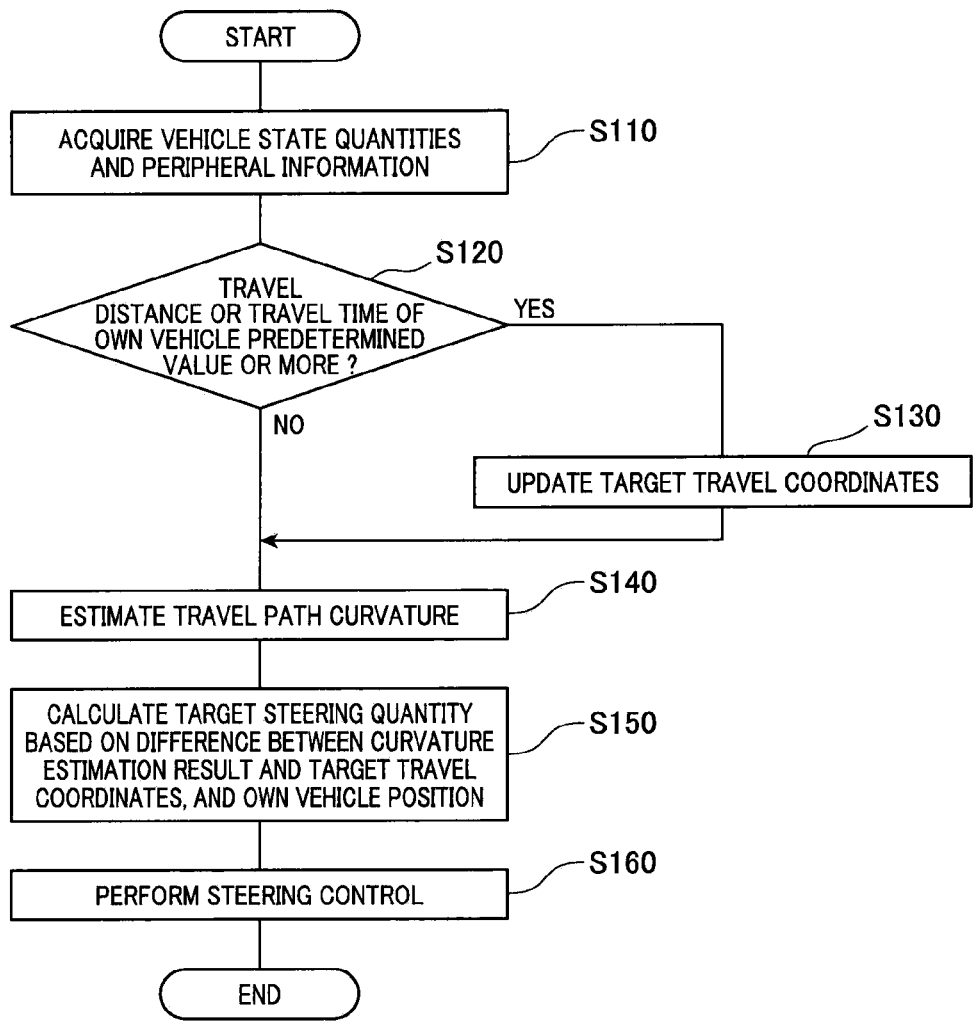
FIG. 5 is a flowchart of processing operations in a travel assisting process.

Next, a travel assisting process performed by the travel assisting device 1 will be described with reference to the flowchart in FIG. 5.

The calculating unit 30 repeatedly performs the travel assisting process at a fixed interval, while the travel assisting device 1 has been enabled by the operation of the driver.

First, at the first step S110, the calculating unit 30 acquires the vehicle state quantities and peripheral information. Here, the vehicle state quantity detecting unit 10 detects the steering angle of the own vehicle (referred to, hereinafter, as the steering angle) using the steering angle encoder. The vehicle state quantity detecting unit 10 also detects the traveling speed of the own vehicle (referred to, hereinafter, as the vehicle speed) using the vehicle speed encoder. The vehicle state quantity detecting unit 10 also detects the yaw rate of the own vehicle using the yaw rate sensor. The vehicle state quantity detecting unit 10 then outputs the detected steering angle, vehicle speed, and yaw rate to the calculating unit 30.

In addition, the periphery monitoring unit 20 detects the traveling lane on which the own vehicle is traveling and the position of a leading vehicle present ahead of the own vehicle using the front sensor, the left-side sensor, the right-side sensor, and the like. The periphery monitoring unit 20 then outputs the information related to the detected traveling lane and the information related to the leading vehicle to the calculating unit 30 as peripheral information.

At subsequent step S120, the calculating unit 30 judges whether or not the travel distance or the travel time of the own vehicle is a predetermined value or more. The predetermined value is set in advance based on experiments or the like. When judged that the travel distance or the travel time of the own vehicle is the predetermined value or more (YES at step S120), the calculating unit 30 updates the target travel coordinates (step S130).

The calculating unit 30 then proceeds to step S140. At this time, the calculating unit 30 updates the target travel coordinates by deleting the oldest target travel coordinates and adding the newest target travel coordinates. On the other hand, when judged that the travel distance or the travel time of the own vehicle is not the predetermined value or more (NO at step S120), the calculating unit 30 proceeds directly to S140.

At step S140, the calculating unit 30 estimates the travel path curvature. Here, the target travel coordinate recording section 31 calculates the target travel coordinates from the traveling lane of the vehicle and the position of the leading vehicle detected by the periphery monitoring unit 20. The target travel coordinates are target coordinates on which the own vehicle should travel. The target travel coordinate recording section 31 then records the calculated target travel coordinates.

Next, the travel path curvature estimating section 32 estimates the travel path curvature based on information related to a target travel coordinate group recorded by the target travel coordinate recording section 31. The travel path curvature is the curvature of the target travel coordinate group.

In this instance, the curvature estimation calculation adjusting section 32a adjusts the weight for each of the target travel coordinates used to estimate the travel path curvature, based on the vehicle speed and yaw rate currently detected by the vehicle state quantity detecting unit 10 and the travel path curvature previously estimated by the travel path curvature estimating section 32.

The multiple curvature estimation result calculating unit 32b performs calculation based on a plurality of estimation results of travel path curvature estimated by the travel path curvature estimating section 32, such that the curvature changes smoothly.

The weight adjustment is performed, for example, from the following perspectives.

(1) When judged that the travel target coordinates are almost straight based on the history of travel path curvature estimations and the vehicle is judged to be traveling in a straight line, the weights of coordinates far from the own vehicle are increased to improve the accuracy of curvature estimation (see FIG. 2A).

(2) When the travel target coordinates change from straight to curved based on the history of travel path curvature estimations and the road on which the vehicle is traveling is judged to be changing from a straight road to a curve, the weights for calculating the coordinates near the own vehicle are increased such that the own vehicle does not erroneously recognize a curve on a straight road and steer based on this recognition (see FIG. 2B).

(3) When the vehicle speed of the own vehicle is high (higher than a predetermined value), the weights of the coordinates far from the own vehicle are increased (see FIG. 2C).

(4) When the vehicle speed is low (less than the predetermined value), the weights of the coordinates near the own vehicle are increased (see FIG. 2D).

In the instances (1) to (4), described above, the weights of the coordinates near the border of the target travel coordinate group are smoothly deviated such that, when the target travel coordinate is added to or deleted from the target travel coordinate group, the weight of the added or deleted target travel coordinate becomes zero.

Figure 4A:
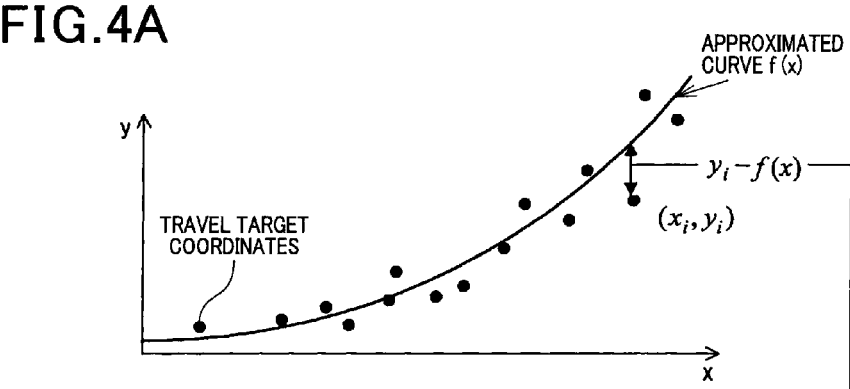
FIG. 4A and FIG. 4B are schematic diagrams for explaining a method for calculating the travel path curvature.

In addition, the travel path curvature is estimated by an approximated curve formed into an arc-like shape that is determined by using the least-squares method, based on the target travel coordinate group (see an approximated curve expressed by f(x) determined by using the least-squares method in the X-Y coordinate system shown in FIG. 4A).

In FIG. 4A, an approximated curve is determined by using the least-squares method, based on n target travel coordinates $(x_1, y_1), (x_2, y_2), \ldots (x_i, y_i), \ldots, (x_n, y_n)$ of the target travel coordinate group (n is a natural number) in the X-Y coordinate system. In this case, a residual sum of squares (RSS) is expressed by:

$$RSS = \sum_{i=1}^{n} \{y_i - f(x)\}^2$$

As the approximated curve, f(x) of which the RSS is smallest is obtained. Based on this approximated curve, the travel path curvature is estimated. This estimation is performed based on conditions, such as the following (1) to (3).

Figure 3A:
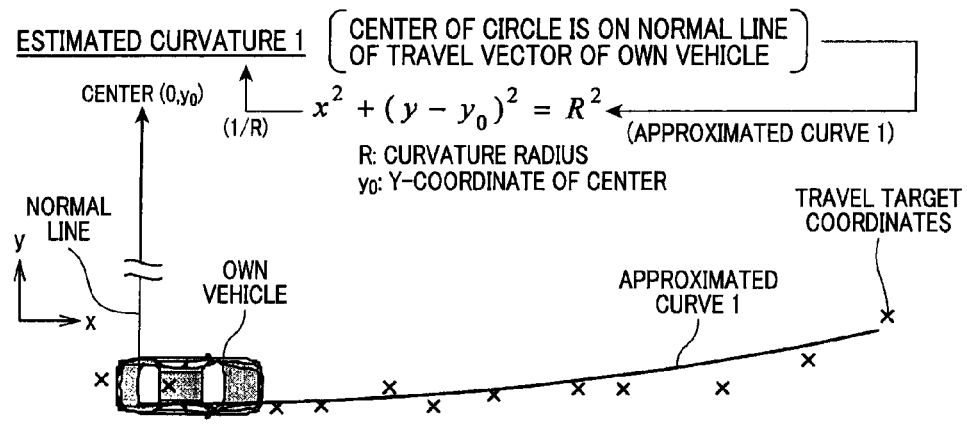
FIG. 3A to FIG. 3C are schematic diagrams for explaining the travel path curvature.

(1) The center of the arc of the approximated curve is set on a normal line of the travel vector of the own vehicle (see an approximated curve 1 in FIG. 3A). In FIG. 3A, the approximated curve 1 in the X-Y coordinate system is expressed by:

$$x^2 + (y-y_0)^2 = R^2$$

where R is a curvature radius of the arc of the approximated curve, and $(0, y_0)$ is the X-Y coordinate of the center. In this example, an estimated curvature (hereinafter referred to as "estimated curvature 1") is obtained by an inverse of curvature radius R (i.e., 1/R).

Figure 3B:
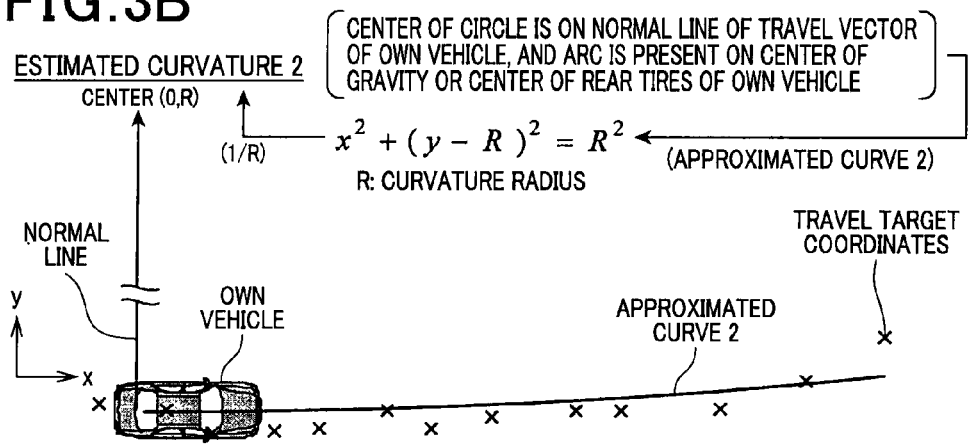

(2) The center of the arc is set on the normal line of the travel vector of the own vehicle. In addition, the arc is set on the center of gravity of the own vehicle or the center of the rear tires of the own vehicle (see an approximated curve 2 in FIG. 3B). In FIG. 3B, the approximated curve 2 in the X-Y coordinate system is expressed by:

$$x^2 + (y-R)^2 = R^2$$

where R is a curvature radius of the arc of the approximated curve, and (0, R) is the X-Y coordinate of the center. In this example, an estimated curvature (hereinafter referred to as "estimated curvature 2") is obtained by an inverse of curvature radius R (i.e., 1/R).

Figure 3C:
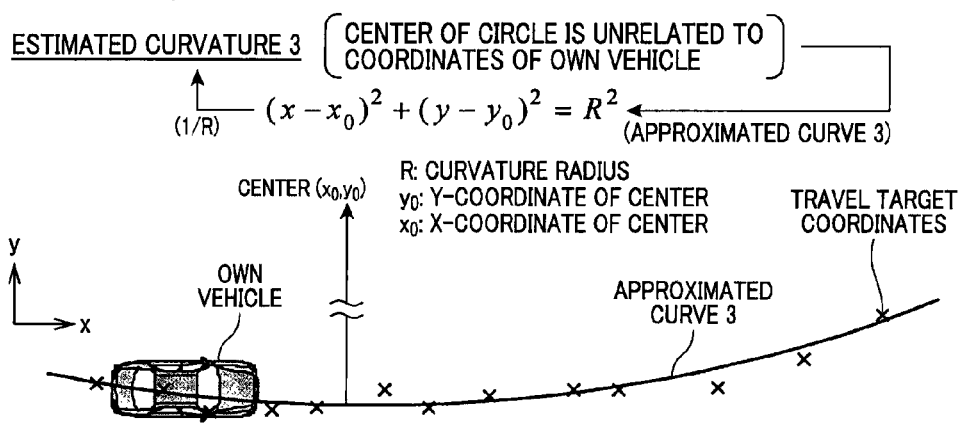

(3) The center of the arc is set at an arbitrary point (see an approximated curve 3 in FIG. 3C). In FIG. 3C, the approximated curve 1 in the X-Y coordinate system is expressed by:

$$(x-x_0)^2 + (y-y_0)^2 = R^2$$

where R is a curvature radius of the arc of the approximated curve, and $(x_0, y_0)$ is the X-Y coordinate of the center. In this example, an estimated curvature (hereinafter referred to as "estimated curvature 3") is obtained by an inverse of curvature radius R (i.e., 1/R).

Figure 4B:
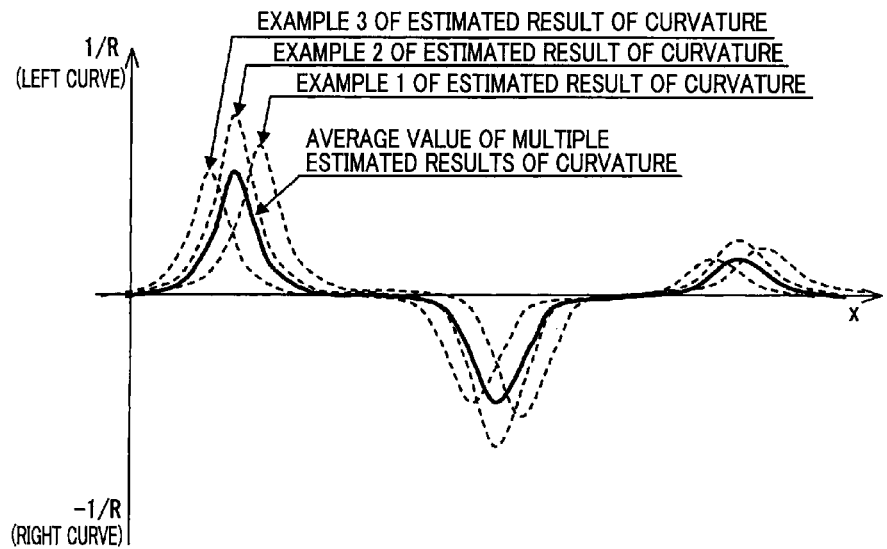

Furthermore, an average value or a minimum value is calculated from the above-described three travel path curvatures (the estimated curvature 1, the estimated curvature 2, and the estimated curvature 3 in FIG. 3A to FIG. 3C), thereby determining the final travel path curvature (see FIG. 4B).

At subsequent step S150, the calculating unit 30 calculates a target steering quantity from the difference between the curvature estimation result and the target travel coordinates, and the own vehicle position. Here, the steering feed-forward calculating means 33 calculates the steering quantity to be steered in advance by the own vehicle based on the travel path curvature estimated by the travel path curvature estimating section 32.

At subsequent step S160, the steering control unit 40 performs steering control such that the own vehicle travels such as to follow the travel path curvature estimated by the calculating unit 30, based on the steering quantity calculated by the calculating unit 30.

The travel assisting process is then completed.

In this way, the travel assisting device 1 according to the present embodiment is capable of improving the accuracy of the travel path curvature estimation. The travel assisting device 1 also actualizes steering control that can track the traveling state of the own vehicle and changes in the shape of the road. Reliability of steering control can be enhanced.

According to the present embodiment, the vehicle state quantity detecting unit is equivalent to a travel state quantity detecting means. The periphery monitoring unit 20 is equivalent to a periphery monitoring means. The target travel coordinate recording section 31 of the calculating unit 30 is equivalent to a target travel coordinate recording means. The travel path curvature estimating section 32 of the calculating unit 30 is equivalent to a travel path curvature estimating means. The steering feed-forward calculating means 33 of the calculating unit 30 is equivalent to a steering feed-forward calculating means. The curvature estimation calculation adjusting section 32a of the calculating unit 30 is equivalent to a curvature estimation calculation adjusting means. The multiple curvature estimation result calculating unit 32b of the calculating unit 30 is equivalent to a multiple curvature estimation result calculating means. The steering control unit 40 is equivalent to a steering control means.

What is claimed is:

1. A vehicle travel assisting device, comprising:
    travel state quantity detecting means for detecting, at a predetermined interval, a vehicle speed and a yaw rate that are travel state quantities indicating a traveling state of an own vehicle;
    periphery monitoring means for detecting, at a predetermined interval, a traveling lane in which the own vehicle is traveling and a position of a leading vehicle present ahead of the own vehicle;
    target travel coordinate recording means for calculating, at a predetermined interval, target travel coordinates that are target coordinates through which the own vehicle should travel, based on the traveling lane and the position of the leading vehicle detected by the periphery monitoring means, and recording the calculated target travel coordinates;
    travel path curvature estimating means for estimating, at a predetermined interval, a travel path curvature that is a curvature of a target travel coordinate group, based on information related to the target travel coordinate group recorded by the target travel coordinate recording means;
    steering feed-forward calculating means for calculating a steering quantity to be steered in advance by the own vehicle, based on the travel path curvature currently estimated by the travel path curvature estimating means; and
    steering control means for performing steering control such that the own vehicle travels such as to follow the travel path curvature estimated by the travel path curvature estimating means, based on the steering quantity calculated by the steering feed-forward calculating means,
    wherein the travel path curvature estimating means includes curvature estimation calculation adjusting means for adjusting a weight for each of the target travel coordinates used to estimate the travel path curvature, based on the vehicle speed and the yaw rate detected by the travel state quantity detecting means and the previously estimated travel path curvature.

2. The vehicle travel assisting device according to claim 1, wherein
    the travel path curvature estimating means estimates the travel path curvature by an approximated curve formed into an arc-like shape which is determined using a least-squares method, based on the target travel coordinate group.

3. The vehicle travel assisting device according to claim 2, wherein
    the travel path curvature estimating means determines the approximated curve such that a center of the arc is set on a normal line of a travel vector of the own vehicle.

4. The vehicle travel assisting device according to claim 2, wherein
    the travel path curvature estimating means determines the approximated curve such that: (i) a center of the arc is set on a normal line of a travel vector of the own vehicle; and (ii) the arc is set on a center of gravity of the own vehicle or a center of rear tires of the own vehicle.

5. The vehicle travel assisting device according to claim 2, wherein
    the travel path curvature estimating means determines the approximated curve such that a center of the arc is set at any point.

6. The vehicle travel assisting device according to claim 1, wherein
    the travel path curvature estimating means includes multiple curvature estimation result calculating means for performing calculation based on a plurality of estimation results of the travel path curvature such that the curvature changes smoothly.

7. The vehicle travel assisting device according to claim 1, wherein
    the curvature estimation calculation adjusting means adjusts the weight of each of the target travel coordinates by smoothly deviating the weight near a border of the target travel coordinate group such that the weight becomes zero when each of the target travel coordinates is added to or deleted from the target travel coordinate group.

8. The vehicle travel assisting device according to claim 2, wherein
    the travel path curvature estimating means includes multiple curvature estimation result calculating means for performing calculation based on a plurality of estimation results of the travel path curvature such that the curvature changes smoothly.

9. The vehicle travel assisting device according to claim 2, wherein
    the curvature estimation calculation adjusting means adjusts the weight of each of the target travel coordinates by smoothly deviating the weight near a border of the target travel coordinate group such that the weight becomes zero when each of the target travel coordinates is added to or deleted from the target travel coordinate group.

10. The vehicle travel assisting device according to claim 3, wherein
    the travel path curvature estimating means includes multiple curvature estimation result calculating means for performing calculation based on a plurality of estimation results of the travel path curvature such that the curvature changes smoothly.

11. The vehicle travel assisting device according to claim 3, wherein
    the curvature estimation calculation adjusting means adjusts the weight of each of the target travel coordinates by smoothly deviating the weight near a border of the target travel coordinate group such that the weight becomes zero when each of the target travel coordinates is added to or deleted from the target travel coordinate group.

12. The vehicle travel assisting device according to claim 4, wherein
    the travel path curvature estimating means includes multiple curvature estimation result calculating means for performing calculation based on a plurality of estimation results of the travel path curvature such that the curvature changes smoothly.

13. The vehicle travel assisting device according to claim 4, wherein
    the curvature estimation calculation adjusting means adjusts the weight of each of the target travel coordinates by smoothly deviating the weight near a border of the target travel coordinate group such that the weight becomes zero when each of the target travel coordinates is added to or deleted from the target travel coordinate group.

14. The vehicle travel assisting device according to claim 5, wherein
the travel path curvature estimating means includes multiple curvature estimation result calculating means for performing calculation based on a plurality of estimation results of the travel path curvature such that the curvature changes smoothly.

15. The vehicle travel assisting device according to claim 5, wherein
the curvature estimation calculation adjusting means adjusts the weight of each of the target travel coordinates by smoothly deviating the weight near a border of the target travel coordinate group such that the weight becomes zero when each of the target travel coordinates is added to or deleted from the target travel coordinate group.

16. The vehicle travel assisting device according to claim 6, wherein
the curvature estimation calculation adjusting means adjusts the weight of each of the target travel coordinates by smoothly deviating the weight near a border of the target travel coordinate group such that the weight becomes zero when each of the target travel coordinates is added to or deleted from the target travel coordinate group.

17. A vehicle travel assisting method, comprising:
at a vehicle travel assisting device mounted in an own vehicle,
detecting, at a predetermined interval, a vehicle speed and a yaw rate that are travel state quantities indicating a traveling state of the own vehicle;
detecting, at a predetermined interval, a traveling lane in which the own vehicle is traveling and a position of a leading vehicle present ahead of the own vehicle;
calculating, at a predetermined interval, target travel coordinates that are target coordinates on which the own vehicle should travel, based on the detected traveling lane and the detected position of the leading vehicle;
recording the calculated target travel coordinates;
estimating, at a predetermined interval, a travel path curvature that is a curvature of a target travel coordinate group, based on information related to the recorded target travel coordinate group;
adjusting a weight for each of the target travel coordinates used to estimate the travel path curvature, based on the detected vehicle speed and the detected yaw rate and the previously estimated travel path curvature;
calculating a steering quantity to be steered in advance by the own vehicle, based on the estimated travel path curvature currently; and
performing steering control such that the own vehicle travels such as to follow the estimated travel path curvature, based on the calculated steering quantity.

* * * * *